S. SALLY.
AUTOMOBILE WHEEL.
APPLICATION FILED JAN. 14, 1913.
1,113,837.
Patented Oct. 13, 1914.
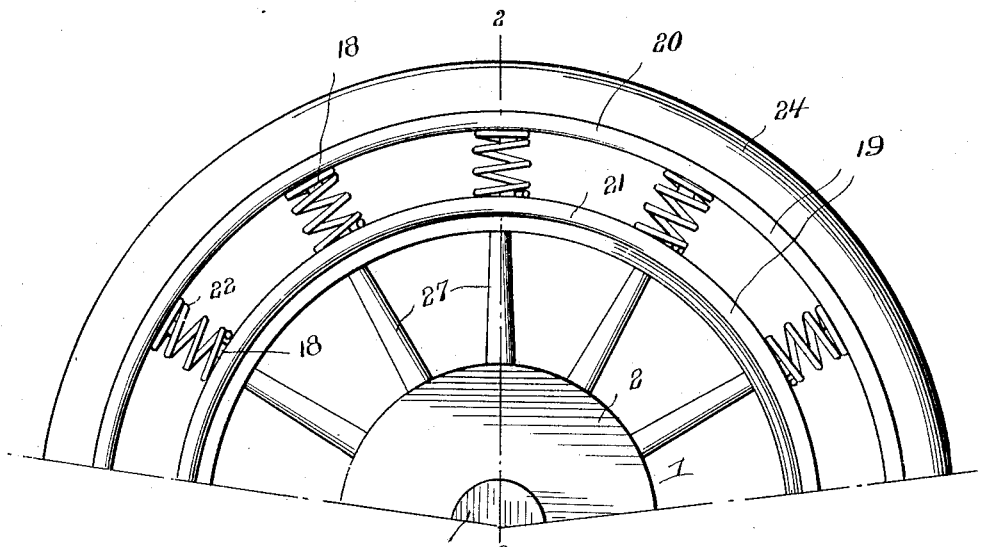
Fig. 1.
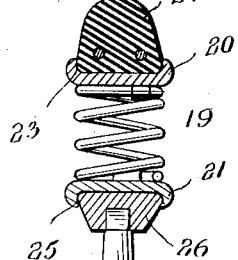
Fig. 2.
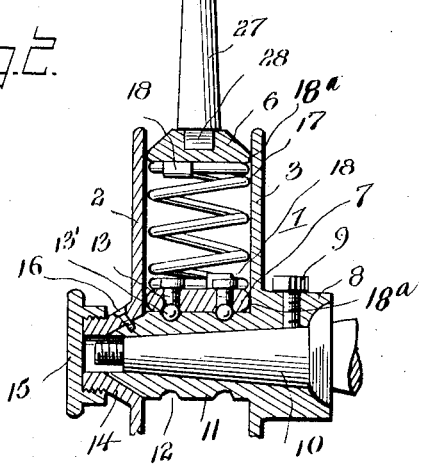
Witnesses
William Smith
James P. Koehl
Inventor
S. Sally.
By Victor J. Evans
Attorney

UNITED STATES PATENT OFFICE.

SYLVESTER SALLY, OF SPOKANE, WASHINGTON, ASSIGNOR OF ONE-THIRD TO WILLIAM SMITH, OF SPOKANE, WASHINGTON.

AUTOMOBILE-WHEEL.

1,113,837.  Specification of Letters Patent.  Patented Oct. 13, 1914.

Application filed January 14, 1913. Serial No. 742,040.

*To all whom it may concern:*

Be it known that I, SYLVESTER SALLY, a citizen of the United States, residing at Spokane, in the county of Spokane and State of Washington, have invented new and useful Improvements in Automobile-Wheels, of which the following is a specification.

This invention relates to automobile wheels; and it has for its object the provision of relatively spaced rim portions which are connected together through the medium of cushioning springs and relatively spaced concentrically arranged hub portions which also have interposed therebetween cushioning springs and which are adapted to coöperate with the rim springs so as to maximize the yielding qualities of the wheel.

A still further object of the invention is to provide means to facilitate the attachment of the wheel to an ordinary axle spindle.

Another object of the invention is to provide means whereby the hub of the wheel will include separable portions that may be readily disconnected from each other so that the springs of the hub may be conveniently removed or repaired without necessitating the entire removal of the wheel from the axle spindle.

With these and other objects in view, the invention consists of certain novel features of construction, combination and arrangement of parts, as will be hereinafter described and claimed.

In the accompanying drawings:—Figure 1 is a side view of a portion of the wheel; and Fig. 2 is a section on line 2—2 of Fig. 1.

The wheel which is designed particularly to be used upon automobiles as a substitute for wheels embodying pneumatic or heavy cushioning tires, preferably comprises a hub 1 including companion side disks 2 and 3. The plate 3 is provided with a tubular extension 8, which is secured by a screw 9 or the like to the spindle 10. The said plate 3 is also provided with a skein or sleeve 11 which receives the spindle 10 therethrough. Said skein or sleeve 11 is provided with annular race ways 12, which are associated with similar race-ways 13 of the ring 7 so as to receive therewith anti-friction bodies 13.

The plate 2 is provided with a tubular extension 14, in which a portion of the spindle 10 extends. The extension 14 is exteriorly threaded to accommodate a corresponding threaded dust-cap 15, so as to prevent dust or foreign matter from entering between the spindle and the sleeve 11. Screws 16 are extended through the extension 14 and operatively connected with the flared end A of the sleeve 11 so as to prevent the relative rotation of the plates 2 and 3. This flared end A of the sleeve serves to brace the disk 2 and to prevent the same from unduly bearing against the ring 6. Springs 17 are interposed between the companion rings 6 and 7 of the hub so as to permit the rings to yield relatively as is evident. The opposite ends of the springs are secured at 18 to the rings 6 and 7 so as to positively cause the springs to rotate with the rings. The rings 6 and 7 are provided with reduced lateral portions which terminate in curved edge surfaces $18^a$, so as to present only the minimum friction between the rings and the companion plates 2 and 3 when the former revolve between the latter.

The rim 19 comprises concentric portions 20 and 21, which have springs 22 interposed therebetween. The portion 20 has a channel 23 wherein is fitted a cushion 24. The portion 21 is preferably provided with a channel 25 wherein is secured a felly 26, to which the outer ends of spokes 27 are connected, the inner ends of said spokes having connection at 28 with the outer ring 6 of the hub.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

A vehicle wheel construction comprising a felly, spaced centrally disposed inner and outer revoluble rings, spokes connecting the outer ring with the felly, the said inner and outer rings being spaced relatively, yieldable devices interposed between said inner and outer rings, a sleeve passing through the inner ring and extending beyond one end thereof and provided with an integral disk lying at one side of the rings, the said sleeve having a flared end, and a removable disk disposed parallel with the fixed disk and having detachable connection with the flared end of said sleeve and lying at the opposite sides of said rings, the said rings having substantially convex side surfaces operating over the inner surfaces of said disks, the engagement of the removable disk with the flared end of the sleeve serving to limit the adjustment of the removable disk with relation to the fixed disk and to prevent the removable disk from unduly bearing against the said inner and outer rings.

In testimony whereof I affix my signature in presence of two witnesses.

SYLVESTER SALLY.

Witnesses:
WM. H. SCHLEEF,
WILLIAM SMITH.

Copies of this patent may be obtained for five cents each, by addressing the "Commissioner of Patents, Washington, D. C."